J. G. KJELLGREN.

TRACTION METER.

APPLICATION FILED JUNE 23, 1916.

Reissued Oct. 23, 1917. 14,381

INVENTOR:
John G. Kjellgren
BY
A. E. Merkel,
ATTORNEY

UNITED STATES PATENT OFFICE.

JOHN G. KJELLGREN, OF CLEVELAND, OHIO.

TRACTION-METER.

Specification of Reissued Letters Patent. Reissued Oct. 23, 1917.

14,381.

Original No. 1,148,325, dated July 27, 1915, Serial No. 681,595, filed March 4, 1912. Application for reissue filed June 23, 1916. Serial No. 105,493.

*To all whom it may concern:*

Be it known that I, JOHN G. KJELLGREN, a subject of the King of Sweden, resident of Cleveland, county of Cuyahoga, and State of Ohio, have invented a new and useful Improvement in Traction-Meters, of which the following is a specification, the pinciple of the invention being herein explained and the best mode in which I have contemplated applying that principle, so as to distinguish it from other inventions.

My invention relates to indicating devices for electrically operated vehicles, the object being to provide an indicator whereby the manner of operation of the vehicle may be determined and especially as regards the consumption of motor current, so that correct conclusions may be drawn as to whether or not such current has been economically and efficiently applied.

The operation of an electrically-operated vehicle such as an electric truck, car or train, may be conveniently divided into three periods between stop and stop, namely:

First, the application of the motive power to start the vehicle and keep it under way;

Second, the shutting off of the motive power to permit the vehicle to run under its own mechanism; and Third, the application of the brakes to bring the vehicle to a halt.

From the standpoint of economy in current consumption, it is of advantage to have the first period as brief as possible, as compared with the other two, and also to utilize the momentum of the car to the greatest possible extent. It is also of advantage, as is obvious, that excessive current be used to the least possible degree during the starting of the car or at any period during its travel.

By providing means for indicating the total travel of the car, and then also providing means for indicating the distance throughout which the current has been applied, the simple process of subtraction will indicate the number of miles the car has traveled on its own momentum and braking. By now adding to the above two indicating means, a device for indicating the distance traveled while excessive current is being used, complete data may be obtained for criticizing the operation of the car, and thus enabling those having the operation of a system in charge, of correcting any improprieties in the operation of the car arising out of ignorance or carelessness on the part of such operators as directly control the consumption of current by the car.

I am aware that devices have heretofore been provided for indicating the total travel of an electrically operated vehicle; also that devices have been provided for indicating the time of the operation of such vehicle during which the motor current was consumed, and further that devices have been provided to indicate the number of times excessive current has been used. Devices have also been provided for indicating the number of times throughout a given travel of a vehicle, the motor current has been turned on.

All these prior devices, however, indicate but one of the three periods of operation of the car above-named, for instance, one of said devices shows how many minutes current has been used, but does not indicate the relation of such duration to the total operation of the car. In other words, the information obtained from such device must be, in order to arrive at a correct conclusion, supplemented with additional information derived from an outside source.

In order, however, to arrive at a correct conclusion and to be permitted to make a correct survey and criticism of the operation of an electrically-operated vehicle, I have found that it is necessary to provide means for determining the total travel, means for determining the total travel of the vehicle while a normal current is being applied, and means for determining the total travel of the vehicle while an excessive current is being applied. While it is advisable to use all three of these devices, any two used together will give sufficient data for arriving at a partial and sometimes sufficient conclusion. For instance, it may be found advisable or expedient at times to omit any one of the above-described devices.

Specifically the objects of my invention are:

First, to provide an indicator which will permit an observer to determine the total distance traveled by the vehicle while a predetermined current is being used;

Second, to combine in one coördinated structure any two of the above-named indicating devices, and Third, to combine in one coördinated structure, all three of such indicators.

Such structure as will carry out any one of the above-named objects may be adopted according to circumstances, as will be understood by those skilled in the art.

My invention consists of means for carrying out the above-named objects, such as are hereinafter fully described and particularly set forth in the claims.

The annexed drawing and the following description set forth in detail certain means embodying my invention, the disclosed means, however, constituting but one of various mechanical forms in which the principle of the invention may be applied.

Figure 4:
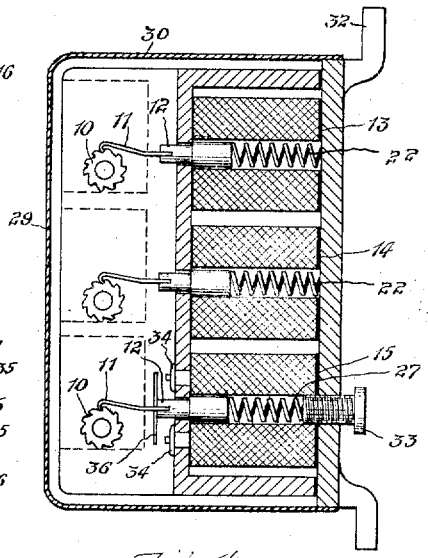
Fig. 4 represents a vertical section of the parts shown in Fig. 3 and taken upon the plane indicated by line IV—IV.

In the illustrated form of my invention, I have provided 3 independent indicator-members X, Y and Z, which consist of suitable counting heads comprising groups of wheels provided with numerals and which are arranged to be interdependent in the well-known manner such as is found, for instance, in a device for counting revolutions. Each such indicator-member is associated with a ratchet-mechanism comprising a ratchet-wheel 10 connected with a unit wheel of its respective indicator-member, and a pawl 11 carried by the armature 12 of solenoids 13, 14 and 15, respectively, as shown in Fig. 4.

Figure 1:
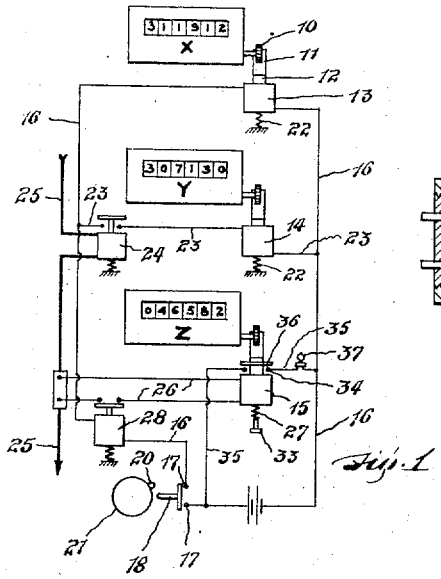
Figure 1 represents a diagrammatic arrangement embodying that part of my invention which provides for the combination of all three indicators in one unitary structure.
Figure 2:
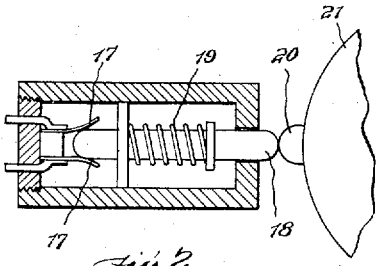
Fig. 2 represents, upon an enlarged scale, the cross-sectional view of a detail portion of the mechanism.

The coil of the solenoid 13 is included in a circuit 16 which is independent of the motor circuit 25 and this independent circuit is normally open as at a switch 17, Fig. 1. This switch includes a contact plunger 18, Fig. 2, which is normally held out of engagement with the other part of the switch, by a spring 19. This plunger is, however, adapted to be periodically pressed into engagement with such other switch member, and thus periodically closes the circuit by a cam 20 preferably secured to a continuously rotating part of the vehicle wheel in motion, such as for instance, an axle or a portion of a wheel. While this arrangement provides for the direct closing of the circuit, by a rotating member, it will be obvious to those skilled in the art, that such closing operation may be effected indirectly by any desired and suitable movable part. This circuit contains a suitable source of energy such as a battery, and such periodic closing thereof will hence periodically energize the solenoid 13 and periodically actuate the armature 12, and thus periodically rotate the corresponding ratchet-wheel 10. The return of the armature to its normal position is effected by means of a suitable coil-spring 22, as shown in Fig. 4 which enables the pawl to engage the next succeeding tooth of such ratchet wheel.

The coil of the solenoid 14 is included in a shunt circuit 23 connected with the circuit 16, as shown in Fig. 1. This shunt circuit, however, is controlled by a relay 24, the coil of which is energized by the main operating circuit 25, from which the motor current is derived. The plunger 12 associated with the solenoid 14 is arranged as described, in connection with the solenoid 13, and operates in precisely the same manner. It will be seen, however, that such operation takes place only when the motor current is energizing the solenoid of the relay so as to close and complete the circuit 23.

It will therefore be seen that the device, so far as it has now been described, will provide for the actuation of the indicator-member X throughout all such time as the car is running, and that the indicator-member Y will be actuated during all such time that the car is run and in which the current is applied.

The coil of the third solenoid 15 forms a part of an auxiliary circuit 26 arranged in parallel with the main motor circuit 25, as shown in Fig. 1. The armature of this solenoid is held in its normal position by means of a spring 27 which is of sufficient strength to prevent the actuating stroke of the pawl 11 from being effected, excepting when an excessive current is flowing through the main operating circuit. An adjusting screw 33 forms a convenient means by which the force of this spring may be regulated in a desired pre-determined manner, that is, if for instance, assuming that the normal current is two hundred amperes, the adjusting screw is arranged so as to cause the spring to prevent the attraction of the armature of the solenoid 15 until the current in the main operating circuit reaches a predetermined value, above two hundred amperes, for instance, three hundred amperes.

It will therefore be noted that this last-described indicator as thus far described, will indicate the number of times an excessive current is caused to flow through the main operating circuit. Inasmuch as excessive current is ordinarily applied only during a faulty start of the car after a stop, it may be under certain circumstances, deemed sufficient to record only this number of times. However, in some instances, it has been found desirable to have a knowledge of the total distance through which the car travels while such excessive current is so applied, that is, to be able to determine the duration of the use of such excessive current.

This duration may be indicated by providing an interrupter 28 consisting of a suitable solenoid, the armature of which opens or closes, that is interrupts the circuit 26, the coil of this solenoid being placed in series in the circuit 16, or the circuit may be mechanically interrupted by means directly or indirectly connected with a moving part of the tractor.

It will therefore be seen that this circuit 26 will become operative periodically and hence the actuating mechanism for the indicator-member Z will also become operative periodically. When excessive current is being used, the number of miles through which the car therefore travels will be in consequence indicated by the indicator-member Z, as will be readily understood by those skilled in the art.

From the above description, it will be readily seen that the indicator, including the indicator Z, may alone be used, if desired, or that a combination of any two of the indicators may be employed.

Figure 3:
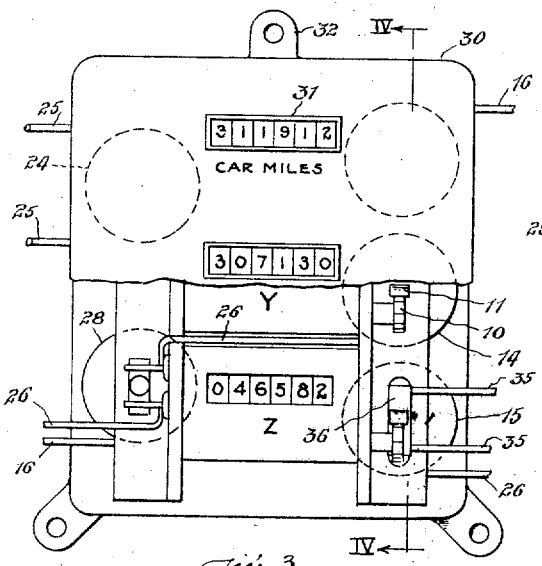
Fig. 3 represents, also upon an enlarged scale, a front elevation of a further detail portion of the device, including those parts and the housing therefor, which directly indicate the data required and from which the observations are taken, a portion of the front of the housing being broken away to disclose the structure in the rear thereof.

When all three are employed, as shown in the illustrated embodiment of my invention, the indicator-members may be advantageously arranged as shown in Figs. 3 and 4, for convenience of inspection. In this case, all three of the indicator-members are arranged adjacent to one face 29 of the housing 30 and sight apertures 31 are provided in the latter through which the totals on the indicator-members are visible. This housing may be supported by supporting brackets 32 by which it may be mounted in view of the operator so that he may readily ascertain whether or not he is exceeding an economical current consumption during the operation of a vehicle.

In addition to the three indicators X, Y and Z, I preferably provide also a signal to warn the operator when excess current is being employed. Various ways of arranging this will readily suggest themselves. For example, a pair of contacts 34 in a signal circuit 35 may be arranged adjacent a connecting strap 36, carried by the armature of the solenoid 15 for the indicator Z. When excessive current is employed, the armature is drawn down so far that the strap 36 connects the contacts 34, thus closing the signal circuit. The particular signal arranged in this circuit may be of any preferred character. For the purpose of illustration I have shown a signal lamp 37 which may be placed at a point distant from the meter and in a conspicuous place with relation to the operator. Obviously, the indicators need not be arranged in a single housing, while the particular operating mechanism and method of wiring are to be regarded as merely illustrative of the invention.

It will thus be seen that by means of the combination of indicators including member X and Y, sufficient data may be obtained for obtaining a fair indication of the operation of the vehicle. By addition of the third indicator, more complete information is obtained, if desired.

While I have shown my invention as applied to an electrically driven vehicle, it will be obvious to those skilled in the art that it may be applied to any electrically driven machine, in which economy of operation and good practice permits the use of the motor current during only a portion of the operating period, or when there is a possibility of unnecessary or excessive current consumption in operation.

Having fully described my invention, what I claim and desire to secure by Letters Patent is:—

1. In an indicating device for electrically operated machines, the combination of an indicator-member and actuating means therefor controlled by a continuously moving part of the machine when in motion, and adapted to indicate the travel total; a second indicator-member and actuating means therefor and an electrical circuit independent of the main operating circuit also adapted to control the operation of the actuating means of the first indicator-member, and in conjunction with the main vehicle operating circuit, to control the operation of the actuating means f the second-named indicator.

2. In an indicating device for electrically operated machines, the combination of an indicator-member; an electrical circuit independent of the vehicle-operating circuit; means controlled by said circuit for actuating said indicator-member; means connected with a moving part of the machine for making and breaking said circuit periodically; a second indicator-member; a second circuit independent of the main-operating circuit; means controlled by said second circuit for actuating said second-named indicator-member; and means controlled by the said main circuit for making and breaking said second-mentioned circuit.

3. In an indicating device for electrically operated machines, the combination of an indicator-member; actuating means for such indicator-member; a circuit connected with the main operating circuit and itself controlling the operation of said actuating means; a second and independent circuit; and means controlled by a continuously moving part of the machine when in motion and adapted to interrupt said second circuit and controlling circuit periodically.

4. In an indicating device for electrically operated machines, the combination of an indicator-member; means controlled by a moving part of the machine when in operation, for actuating said indicator-member so as to indicate the total travel; a second indicator-member arranged to be actuated only during the consumption of the main operating current; and an electrical circuit independent of the main circuit adapted to control the operation of the first-named indicator-member and also partially control the operation of the second-named indicator-member.

5. In an indicating device for electrically operated machines, the combination of an indicator, means for partially controlling the operation of said indicator and itself controlled by the main operating circuit; a second indicator partially controlled by said main operating circuit and adapted to operate only during an excessive consumption of motor current; and means for periodically rendering said last-named controlling means operative.

6. An electric meter device for tractors or the like comprising an indicator-member; electrically-actuated means for actuating the same, a circuit independent of the motor circuit for energizing said actuating means; and means in connection with a moving part of the tractor for closing said circuit when the tractor is in motion; in combination with an independent indicator-member in parallel in said circuit and means in connection with the motor circuit for closing the circuit for said second indicator-member only when the motor circuit is in use; together with a third indicator-member in the motor circuit and means for actuating same only during the consumption of excessive current.

7. An electric meter device for tractors or the like, comprising an indicator-member; electrically-operated means for actuating the same; a circuit independent of the motor circuit for energizing said actuating means; and means in connection with a moving part of the tractor for closing said circuit when the tractor is in motion; in combination with an independent indicator-member in parallel in said circuit and means in connection with the motor circuit for closing the circuit for said second indicator-member only when the motor circuit is in use; together with a third indicator-member in the motor circuit and means for intermittently actuating the same only during the consumption of excessive current.

8. An electric meter device for tractors or the like comprising an indicator; electrically-operated means for actuating the same; a circuit independent of the motor circuit for energizing said actuating means; and means in connection with a moving part of the tractor for closing said circuit when the tractor is in motion; in combination with an independent indicator-member in parallel in said circuit; and means in connection with the motor circuit for closing the circuit for said second indicator-member only when the motor circuit is in use; together with a third indicator-member in the motor circuit; a relay in the motor circuit and means in connection with the independent circuit for actuating said relay to close the actuating circuit.

9. In a meter for electric tractors or the like, a ratchet-operated indicator-member; electro-magnetic means for actuating the ratchet, a circuit for operating said electro-magnetic means; and intermittently-actuated means controlled by a continuously-moving element of the tractor when the latter is in motion, for rendering said circuit operative; in combination with a second ratchet-operated indicator-member; and means for controlling the operation thereof from said circuit and the tractor circuit, said means comprising an electro-magnet for actuating the ratchet and an interrupter in the electro-magnet circuit, said interrupter and electro-magnet being arranged one in the auxiliary circuit and one in the tractor circuit.

10. In a meter for electric tractors, a ratchet-operated indicator-member, electro-magnetic means for actuating the ratchet; a circuit for operating said electro-magnetic means, and intermittently-actuated means controlled by a continuously-moving element of the tractor when the latter is in motion, for rendering said circuit operative; in combination with a second ratchet-operated indicator-member; and means for controlling the operation thereof from said circuit and the tractor circuit, said means comprising an electro-magnet for actuating the ratchet and an interrupter in the electro-magnet circuit, said interrupter and electro-magnet being arranged one in the first-named circuit and one in the tractor circuit; together with a third indicator-member; means similar to those for operating the second indicator-member for operating said third indicator-member; and means controlling the element in the tractor circuit to insure its operation only upon the use of excessive current.

11. In a meter for electric tractors, a ratchet-operated indicator-member; electro-magnetic means for actuating the ratchet; a circuit for operating said electro-magnetic means; and intermittently-actuated means controlled by a continuously-moving element of the tractor when the latter is in motion, for rendering said circuit operative; in combination with a second ratchet-operated indicator-member; and means for controlling the operation thereof from said circuit and the tractor circuit, said means comprising an electro-magnet for actuating the ratchet and an interrupter in the electro-magnet circuit, said interrupter and electro-magnet being arranged one in the said first-named circuit and one in the tractor circuit; together with means for controlling the element in the tractor-circuit to insure its operation only on the use of excessive current.

12. In a meter for electric tractors, the combination of a casing; a plurality of indicator-members arranged therein; an independent circuit-means controlled by the tractor for operating one of said indicator-members to indicate the travel total; and means controlled jointly by said independent circuit and the tractor circuit for operating another of said indicator-members to record the total travel under power.

13. In a meter for electric tractors, a casing, a plurality of indicator-members arranged therein, an independent circuit, means controlled thereby for operating one of said indicator-members to indicate the travel total, and means controlled jointly by said independent circuit and the tractor circuit for operating another of said indicator-members to record the total travel under power; and a third indicator-member for recording the total travel under excessive power.

14. In an indicating device for electrically operated machines, in combination, means for indicating total run, means for indicating run with current on, means for indicating run under excess current, a primary circuit, a second circuit and connections whereby the actuation of any of said indicators while effected by one current may be controlled by the other.

15. In an indicating device for recording service on electrically driven machines, in combination, means for indicating total run, means for indicating run under power, and means controlled by current pressure, for indicating run under excessive current, whereby by the process of subtraction, run without current, and run under normal current can be determined.

16. In an indicating device for recording service on electrically driven machines, in combination, a main or driving circuit, a second and independent circuit having its own generator, an electrical indicator for total run, an electric indicator for run under normal power, and an electrical indicator for excess power use, said indicators being actuated each by one of said circuits the actuation in each instance being controlled through the other circuit.

Signed by me this 21st day of June, 1916.

JOHN G. KJELLGREN.